: US 10,671,247 B2
(45) Date of Patent: Jun. 2, 2020

(12) United States Patent
Zhang

(54) DISPLAY METHOD AND DISPLAY APPARATUS

(71) Applicant: Beijing Neusoft Medical Equipment Co., Ltd., Beijing (CN)

(72) Inventor: Zhen Zhang, Shenyang (CN)

(73) Assignee: Beijing Neusoft Medical Equipment Co., Ltd., Beijing (CN)

( * ) Notice: Subject to any disclaimer, the term of this patent is extended or adjusted under 35 U.S.C. 154(b) by 0 days.

(21) Appl. No.: 15/792,637

(22) Filed: Oct. 24, 2017

(65) Prior Publication Data

US 2018/0113580 A1 Apr. 26, 2018

(30) Foreign Application Priority Data

Oct. 24, 2016 (CN) .......................... 2016 1 0927669

(51) Int. Cl.
*G06F 3/0482* (2013.01)
*G06F 9/451* (2018.01)
*G06F 9/30* (2018.01)
*G06T 3/00* (2006.01)
*G06T 5/50* (2006.01)
*G06T 7/00* (2017.01)

(52) U.S. Cl.
CPC .......... *G06F 3/0482* (2013.01); *G06F 9/3009* (2013.01); *G06F 9/451* (2018.02); *G06T 3/0018* (2013.01); *G06T 5/50* (2013.01); *G06T 7/0012* (2013.01); *G06T 2200/32* (2013.01); *G06T 2207/30004* (2013.01)

(58) Field of Classification Search
CPC .................................................... G06F 3/0482
USPC ........................................................ 715/810
See application file for complete search history.

(56) References Cited

U.S. PATENT DOCUMENTS

| 5,798,760 A | * | 8/1998 | Vayda | G06F 3/0482 715/834 |
| 6,369,837 B1 | * | 4/2002 | Schirmer | G06F 3/0485 715/764 |
| 8,121,902 B1 | * | 2/2012 | Desjardins | G06Q 30/0601 705/26.1 |

(Continued)

FOREIGN PATENT DOCUMENTS

| CN | 102929642 A | 2/2013 |
| CN | 103210371 A | 7/2013 |

(Continued)

OTHER PUBLICATIONS

State Intellectual Property Office of the People's Republic of China, Office Action and Search Report Issued in Application No. 201610927669.4, dated Nov. 21, 2019, 9 pages. (Submitted with Partial Translation).

*Primary Examiner* — Daniel Rodriguez
(74) *Attorney, Agent, or Firm* — McCoy Russell LLP

(57) ABSTRACT

A display method and display apparatus are provided. The display method includes: an image to be viewed is activated; an instructing operation from a user is monitored; a Tools menu associated with the activated image is displayed according to a first instructing operation; options in the Tools menu are toggled according to a second instructing operation for the Tools menu; an option from the toggled options is selected according to a user operation; and the activated image is displayed according to the selected option.

16 Claims, 7 Drawing Sheets

(56) References Cited

U.S. PATENT DOCUMENTS

| | | | | |
|---|---|---|---|---|
| 8,296,291 B1* | 10/2012 | Desjardins | G06F 16/5866 | 707/723 |
| 8,660,358 B1* | 2/2014 | Bergboer | G06K 9/00677 | 345/629 |
| 2005/0213849 A1* | 9/2005 | Kreang-Arekul | G06T 3/4038 | 382/284 |
| 2005/0237324 A1* | 10/2005 | Guhring | G06T 15/08 | 345/419 |
| 2006/0026535 A1* | 2/2006 | Hotelling | G06F 3/0418 | 715/863 |
| 2006/0161870 A1* | 7/2006 | Hotelling | G06F 3/0485 | 715/863 |
| 2006/0161871 A1* | 7/2006 | Hotelling | G06F 3/0485 | 715/863 |
| 2006/0212829 A1* | 9/2006 | Yahiro | G06F 3/0482 | 715/810 |
| 2008/0059913 A1* | 3/2008 | Burtner | G06F 3/0482 | 715/854 |
| 2009/0027330 A1* | 1/2009 | Aida | G06F 3/04883 | 345/156 |
| 2009/0083662 A1* | 3/2009 | Fitzmaurice | G06F 3/04815 | 715/810 |
| 2010/0248787 A1* | 9/2010 | Smuga | G06F 3/04842 | 455/566 |
| 2010/0281374 A1* | 11/2010 | Schulz | G06F 3/0482 | 715/723 |
| 2012/0203651 A1* | 8/2012 | Leggatt | G06Q 30/0621 | 705/26.3 |
| 2012/0272144 A1* | 10/2012 | Radakovitz | G06F 3/04883 | 715/702 |
| 2013/0019173 A1* | 1/2013 | Kotler | G06F 3/0482 | 715/711 |
| 2013/0019174 A1* | 1/2013 | Gil | G06F 3/04812 | 715/711 |
| 2013/0019175 A1* | 1/2013 | Kotler | G06F 3/0482 | 715/728 |
| 2013/0019182 A1* | 1/2013 | Gil | G06F 3/0482 | 715/738 |
| 2013/0120294 A1* | 5/2013 | Sun | G06F 3/041 | 345/173 |
| 2014/0123192 A1* | 5/2014 | Seo | H04N 21/4826 | 725/46 |
| 2015/0205455 A1* | 7/2015 | Shaw | G06F 3/0484 | 715/834 |
| 2015/0261402 A1* | 9/2015 | Tanaka | G06F 3/0484 | 715/762 |
| 2015/0378600 A1* | 12/2015 | Sloan | G06F 3/0482 | 715/773 |
| 2016/0026345 A1* | 1/2016 | Yao | G06F 3/0488 | 715/815 |
| 2016/0124602 A1* | 5/2016 | Chien | H04N 5/23229 | 345/173 |
| 2016/0179845 A1* | 6/2016 | Nguyen | G06F 16/9577 | 715/204 |
| 2017/0286186 A1* | 10/2017 | Kagan | G06F 9/4812 | |
| 2018/0084257 A1* | 3/2018 | Abbas | H04N 19/85 | |
| 2018/0144556 A1* | 5/2018 | Champion | G06F 3/04842 | |
| 2018/0276800 A1* | 9/2018 | Abbas | G06T 9/001 | |

FOREIGN PATENT DOCUMENTS

| | | |
|---|---|---|
| CN | 104182136 A | 12/2014 |
| CN | 104487978 A | 4/2015 |

\* cited by examiner

DISPLAY METHOD AND DISPLAY APPARATUS

CROSS REFERENCE TO RELATED APPLICATIONS

This application claims priority to Chinese Patent Application No. 201610927669.4, entitled "DISPLAY METHOD AND DISPLAY APPARATUS," filed on Oct. 24, 2016, the entire contents of which are incorporated herein by reference for all purposes.

TECHNICAL FIELD

The present disclosure relates to a display method and display apparatus.

BACKGROUND

An image mosaic technique may include: a group of images that are partially overlapped mutually, are spatially matched and aligned, and a wide-view-angle, complete, high definition new image with information of the group of images is formed after resampling and fusion. Image mosaic is an important research direction in the field of digital image processing and has extensive applications in the fields of photogrammetry, computer vision, remote sensing image processing, medical image analysis, computer graphics and so on.

Since a large-range panoramic medical image can assist a doctor to visualize lesion and surrounding tissues more comprehensively and visually, medical image mosaic has been widely applied in medical image research. A doctor may toggle a plurality of options for a diagnostic image in a diagnostic process to make an accurate diagnosis through the diagnostic image. Relevant options for images may be frequently used by the doctor. The doctor may search for an option by moving a cursor of a mouse to a toolkit including the relevant options. The cursor may be moved to a text or an image and then the mouse may be clicked for operation. When it is required to toggle other options, the above steps will be repeated, and the process may be relatively complicated.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

DETAILED DESCRIPTION

Figure 1:
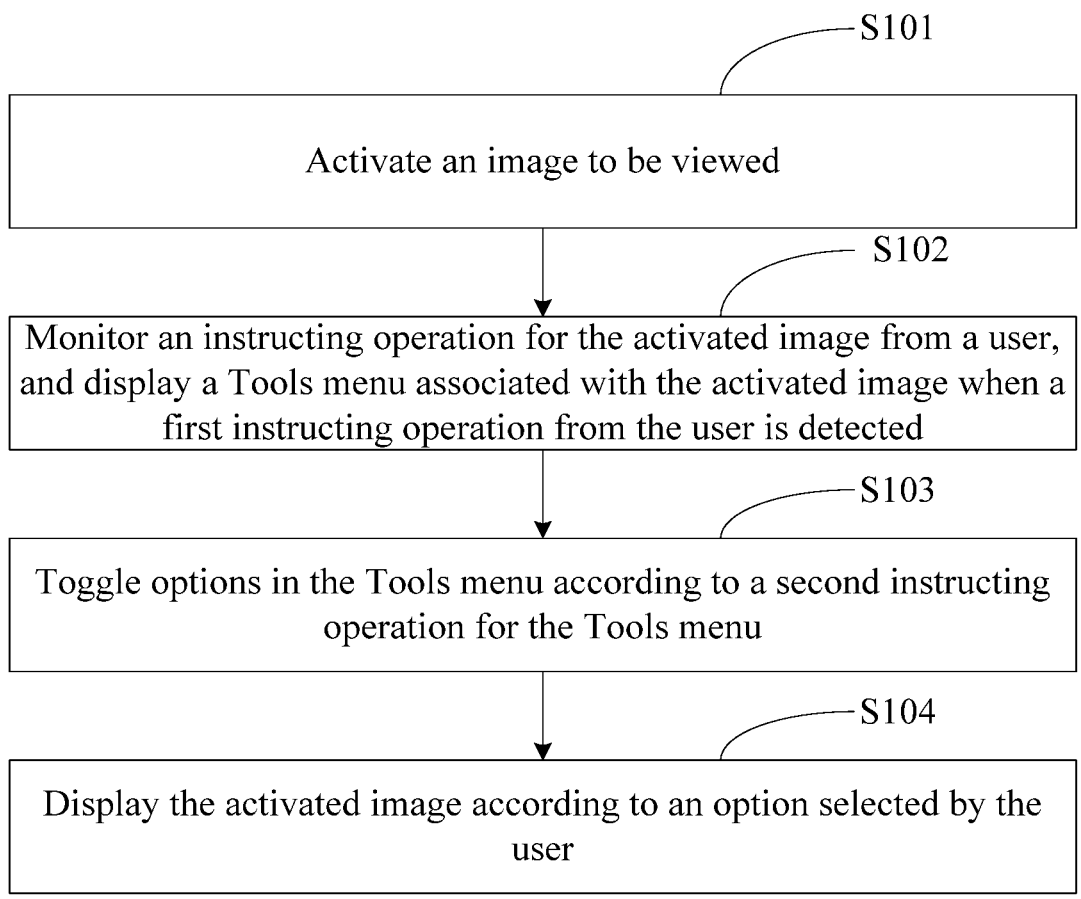
FIG. 1 is a flow diagram of a process illustrating a display method according to an example of the present disclosure.

FIG. 1 is a flow diagram of a process illustrating a display method according to an example of the present disclosure. The present disclosure provides a display method which may be applied to toggling and viewing images in panoramic medical imaging. The process includes the following blocks 101-104.

At block S101, an image to be viewed is activated.

In an example, the image to be viewed may be activated according to a mouse instructing operation from a user. When toggling and viewing images in panoramic medical imaging, a plurality of images may be spliced in an image display page in a way that each of the plurality of images may be displayed in an image window on the image display page and each of the images has an area range with the corresponding image window as a boundary. Every mouse event in the image display page may be monitored. So, an image to be viewed may be activated according to a mouse instructing operation from the user. The mouse events may include but are not limited to: single click, double click, moving, dragging, wheel scrolling, hovering and so on.

At block S102, an instructing operation for the activated image from a user is monitored, and a Tools menu associated with the activated image is displayed when a first instructing operation from the user is detected.

The first instructing operation may be a mouse click operation or a touch-to-click operation on the activated image in the above block. Associating the Tools menu with the activated image may include: displaying the Tools menu according to the first instructing operation from the user; displaying one or more options in the Tools menu according to the storage type of the activated image in a way that the one or more options may be applied to the activated image; associating the one or more options with the activated image; and hiding other options unavailable for the activated image. For example, when the activated image is a photo format image, options such as Zoom In, Rotate, Flip and so on for viewing the activated image may be displayed in the Tools menu. The options such as Zoom In, Rotate, Flip and so on may be associated with the activated image, and 3D options may be hidden for it. When the activated image is a 3D image, options such as Detection Display, 3D Display or the like for viewing the 3D activated image may be displayed in the Tools menu, and Detection Display or 3D Display may be associated with the three-dimensional activated image. However, options such as Zoom In, Rotate, Flip and so on may be hidden for the 3D activated image.

After an image displayed on the image display page in the block S101 is activated, an instructing operation from the user may be continuously monitored. In an example, when a click operation of a left mouse button performed by the user for the activated image is detected as the first instructing operation, a Tools menu for viewing the activated image may be displayed according to the click operation of the left mouse button. In another example, when a touch-to-click operation performed by the user for the activated image is detected as the first instructing operation, a Tools menu for viewing the activated image may be displayed according to the touch-to-click operation performed by the user.

The block S102 may further include: cancelling the display of the Tools menu according to the first instructing operation from the user. For example, when a click operation of the left mouse button is detected out of the Tools menu, the display of Tools menu may be cancelled.

At block S103, options in the Tools menu may be toggled according to a second instructing operation for the Tools menu.

The second instructing operation may be used to toggle a hit option in the Tools menu. The second instructing operation may include a left single/double click, a right single/double click, and/or a middle button single/double click on a mouse as well as other operations for toggling the options, such as keyboard operation.

The user may select any option in the above Tools menu through the mouse. When the second instructing operation for toggling options is received from the user, the options may be toggled according to the second instructing operation. For example, when an operation of a mouse wheel is detected as the second instructing operation, options in the Tools menu may be toggled according to scrolling of the mouse wheel.

At block S104, the activated image is displayed according to an option selected by the user.

In an example, the image may be displayed according to an option selected by a third instructing operation for the Tools menu from the user. For example, according to the option Flip Left selected by the user, the activated image may be flipped to the left, and the left-flipped image may be displayed.

In another example, an option may be selected according to the third instructing operation for the Tools menu from the user, and thus an image transformation function corresponding to the selected option may be invoked to process and display the activated image according to a fourth instructing operation from the user.

The third instructing operation may be used to select an option in the Tools menu. The third instructing operation may include a left single/double click, a right single/double click and/or a middle button single/double click on a mouse as well as any other operation for selecting the options, such as keyboard operation.

The fourth instructing operation refers to an instructing operation for a user to specifically view the activated image. The fourth instructing operation may include but is not limited to instructing operations such as zooming in, zooming out, rotating (rotating left, rotating right), flipping (flipping left, flipping right), detection displaying or 3D displaying the image. The fourth instructing operation may also be an operation for deselecting the option.

When the desired option is toggled, the third instructing operation for selecting the desired option may be monitored, and the desired option may be selected according to the third instructing operation. For example, the desired option may be selected according to the third instructing operation of clicking middle mouse button. After the desired option is selected according to the third instructing operation from the user, a further instructing operation of utilizing the desired option by the user may be continuously monitored. When the fourth instructing operation is monitored, an image transformation function for viewing image may be invoked to process the image and display the processed image. For example, when a user selects a Magnifier option in the Tools menu according to the third instructing operation, other options in the Tools menu may be collapsed or hidden. The cursor may be switched to a magnifier icon. An algorithm program of the magnifier may be invoked to zoom-in or zoom-out the image according to the fourth instructing operation.

According to the display method in the present disclosure, operable options for viewing image may be combined to facilitate the user to select the option. When each time toggling options, it is no longer desired to invoke the options in a toolkit or in the Tools menu. Thus, the process for selecting an option may be simplified, and the image viewing efficiency is improved.

Figure 2:
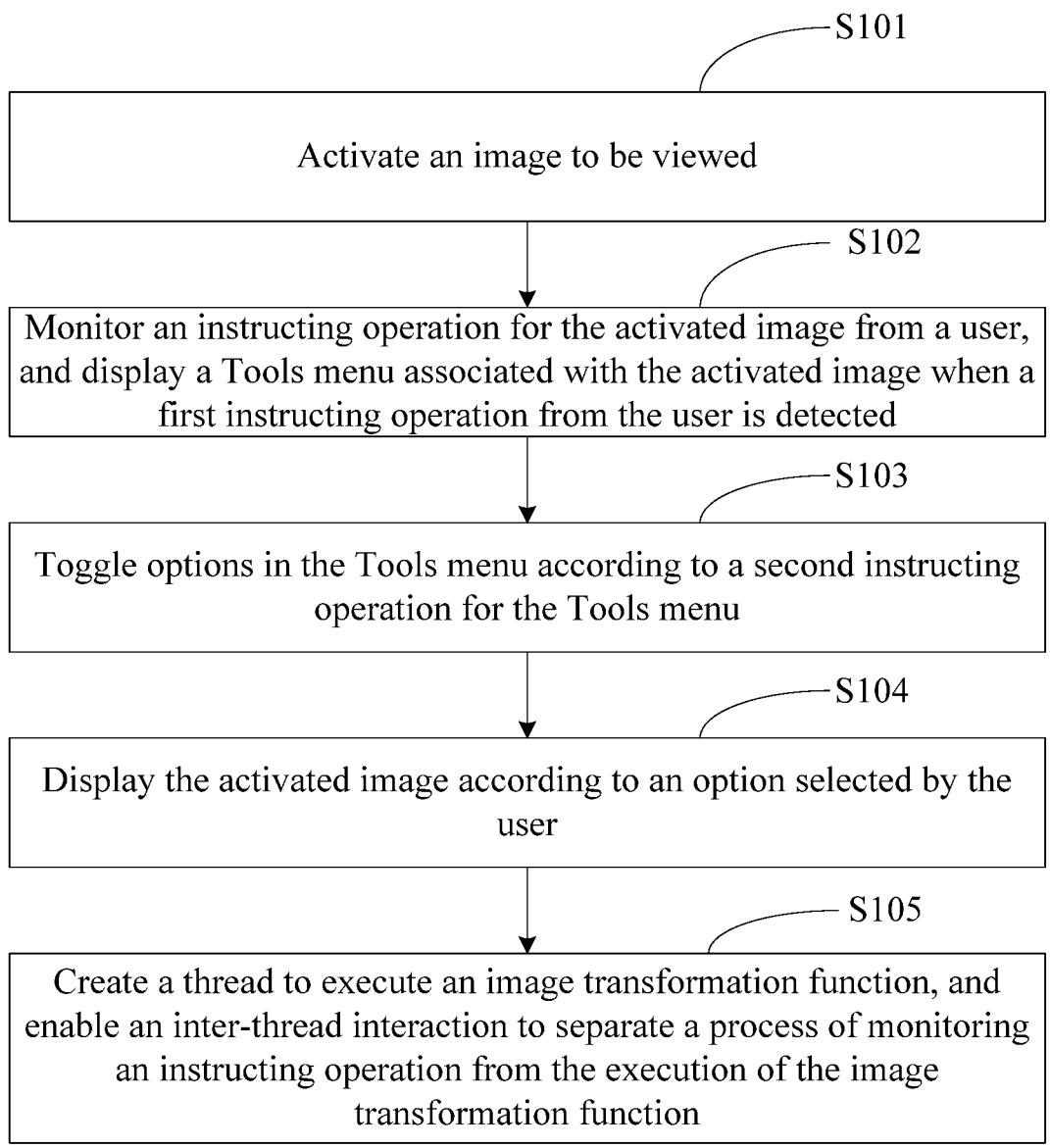
FIG. 2 is a flow diagram of a process illustrating a display method according to another example of the present disclosure.

FIG. 2 is a flow diagram of a process illustrating a display method according to another example of the present disclosure. As shown in FIG. 2, in an example, the display method further includes the following block 105.

At block S105, a thread is created to execute an image transformation function, and an inter-thread interaction is enabled to separate a process of monitoring an instructing operation from the execution of the image transformation function.

When an option is available, the option may be selected. For example, in a default state, a Magnifier option is selected. When the created thread executes the algorithm program of the image transformation function, the inter-thread interaction may be enabled to separate a process of monitoring an instructing operation from the execution of the algorithm program of the image transformation function corresponding to the instructing operation. Monitoring the instructing operation includes but is not limited to monitoring a mouse event, an event for invoking and executing the algorithm program and a keyboard operation event. The mouse event may include Mouse Moving, Clicking, Mouse Position, etc. The algorithm program includes an execution program to zoom in, zoom out, rotate, flip, detection display or 3D display an image.

Figure 3:
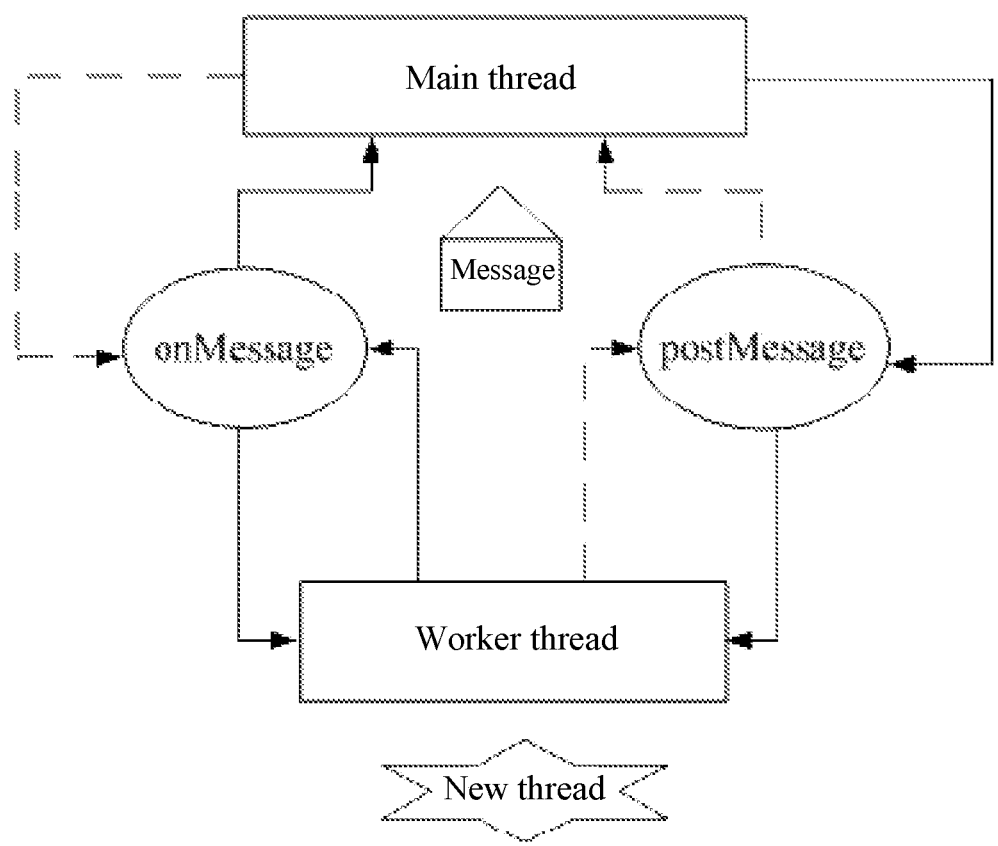
FIG. 3 is a flow diagram of data processing of inter-thread interaction according to an example of the present disclosure.

FIG. 3 is a flow diagram of data processing of inter-thread interaction according to an example of the present disclosure. Taking the magnifier option for example, when a fourth instructing operation, e.g., zooming in or zooming out an image, on the image performed by a user, a new User Interface (UI) thread may be created to display a magnified image in the scope of the magnifier. A main thread is configured to monitor the first instructing operation, the second instructing operation, the third instructing operation, the fourth instructing operation, other mouse events, keyboard operation events or the like, which are performed by the user. Separating may include: monitoring an instructing operation (e.g., a click on a left mouse button to zoom in the image) from the user in the main thread; transmitting, by the main thread, the monitored instructing operation from the user to the created UI thread; performing, by the created UI threshold, an algorithm of image magnification, and displaying a resulted image corresponding to the fourth instructing operation from the user.

In an example, programs for separating may include: the main thread receives a message of the resulted image from a worker thread (the created UI threshold) executed by an onMessage method, and the main thread sends a message of instructing operation to the worker thread executed by a postMessage method. The postMessage is a common function in Windows Application Programming Interface (API) to put a message into a message queue. The worker thread receives the message of instructing operation from the main thread executed by the postMessage method. The worker thread sends the message of the resulted image to the main thread executed by the onMessage method. The created UI thread is the worker thread, which is a message thread independent of the main thread and can complete message processing by executing a message action alone without occupying resources of the main thread. Application of multiple tasks in a multi-thread scenario is taken into full account, and the hardware performance is brought into full play to implement the optimum experience effect.

If two programs, one for monitoring an instructing operation and another for the image transformation function algorithm, are processed within one thread, the thread may be blocked. For example, within one thread, both monitoring the first instructing operation, the second instructing operation, the third instructing operation and the fourth instructing operation from a user and executing an image transformation function algorithm program are executed, which may cause the thread to be blocked and the display unsmooth. A process of executing the image transformation function and a process of monitoring an instructing operation are separated, such that blocking within a single-thread is eliminated and the display is smoothed.

It is noted that the above block 105 of FIG. 2 is applicable to any block or between any two blocks in blocks 101-104 of FIG. 1 to smooth the display.

Further, the options include but are not limited to: Detection Display, 3D Display, Zoom In, Zoom Out, Rotate and Flip. The detection display may refer to that a display function possessed by a medical device utilizing a detection imaging technique is configured in an operating system; and the 3D display may refer to that a 3D display function possessed by a medical device utilizing a 3D imaging technique is configured in the operating system. A doctor may select a target area (e.g., bone, soft tissue, etc.) by using detection display and select a display form of an image by using 3D display. For example, a photo may be displayed in a two-dimensional form, and an image may be displayed in a 3D form, etc. Detection Display and 3D Display options may be added on the Tools menu. On a medical image, Detection Display option may be toggled to display an internal image of a body part, and the 3D option may also be toggled to display a 3D image of a body part. Zoom In, Zoom Out, Rotate and Flip may refer to a Zoom function, a Rotate Left function, a Rotate Right function, a Flip Left function, a Flip right function, etc for viewing an image.

In an example, activating an image to be viewed in the above block S101 may further include: when the cursor enters an area range of an image in the image display page, activating the image; and/or when a hovering position of the cursor is within an area range of an image in the image display page, activating the image.

When determining a real-time coordinates, a sliding track or a hovering position of the cursor, a coordinate system may be built in the display area with a multi-point area partitioning method. There are a plurality of coordinate points in the coordinate system, and when the cursor passes by a coordinate point, its position in the display area can be determined. For example, a sliding event S1 starts from a point S1 in a sliding direction along a straight line L which is made up by several coordinate points, and a final position P2 of the cursor in the sliding event S1 can be obtained. The above method of determining a position of the cursor in a mouse event is not unique, and other methods may also be used, which will not be limited herein. The image may be activated for a further operation. This block better facilitates image selection. When each time toggling options, it is no longer desired to invoke the options in a toolkit or in the Tools menu.

An image in the image display page may be selected by monitoring a slide-to-click event of a mouse and/or a hovering event of a cursor, and the selected image may be activated. Certainly, the selected image may also be activated with other manner, for example, clicking on an image with the mouse. When the above function of selecting the image by monitoring the sliding and hovering events is not enabled, the image may be activated by clicking on it with the mouse.

In the above block 102 of FIG. 1, displaying the Tools menu associated with the activated image includes: replacing the cursor style with the Tools menu associated with the activated image, where the Tools menu includes at least two areas with a first area for displaying an option in the Tools menu and a second area for displaying other options in the Tools menu.

In an example, the Tools menu is displayed in the vicinity of the area range of the activated image, and the options included in the Tools menu may be displayed according to priority from high to low frequencies being used. The layout of display may be in a form of a list, etc. An option in the Tools menu may be selected to view the image, for example, zoom in, zoom out, rotate, flip, detection display or 3D display for the image.

The option in the first area may be a default option or an option with the highest priority, and the other options in the second area may surround the first area and be arranged clockwise or counterclockwise according to priority. When the other options displayed in the second area are out of a range of the second area, a part of the other options may be displayed in the second area, and remaining options in the other options are hidden and displayed in specified icons.

Figure 4:
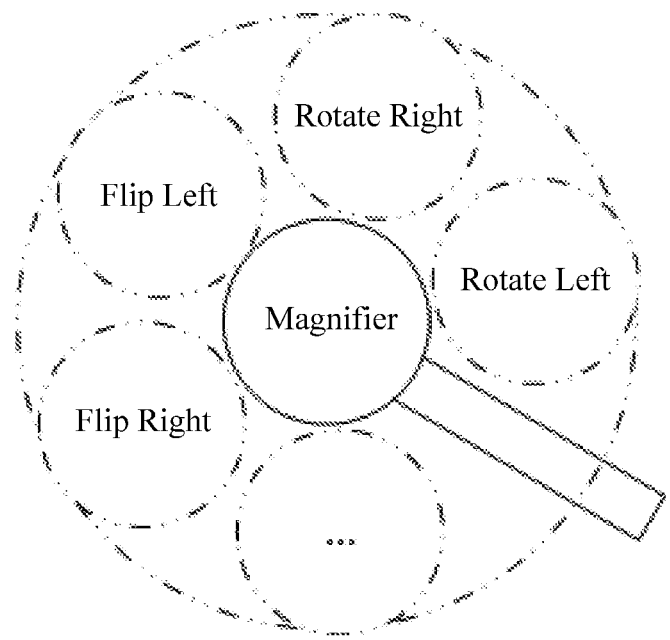
FIG. 4 is a diagram illustrating a configuration of options according to an example of the present disclosure.
Figure 5:
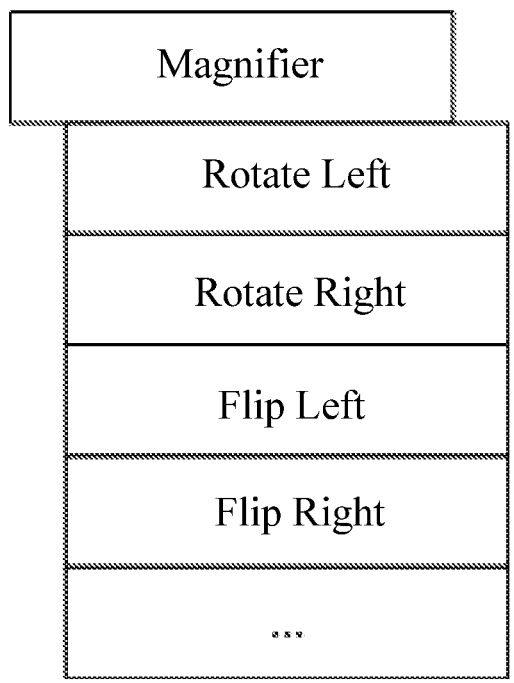
FIG. 5 is a diagram illustrating a configuration of options according to another example of the present disclosure.

FIG. 4 is a diagram illustrating a configuration of options according to an example of the present disclosure. As shown in FIG. 4, the options of the Tools menu are displayed in borders with circular or polygonal boundaries formed by dotted lines, or in borders with circular or polygonal boundaries formed by full lines, to improve the friendliness of the display interface. Certainly, the Tools Menu may also be displayed in an area without borders, e.g., without borders formed by dotted lines or full lines. The options include Magnifier, Rotate Left, Rotate Right, Flip Left, Flip Right, etc., The magnifier may be an option with the highest priority, and the priority may be determined according to the used frequency of the option; or an option may be set as default with the highest priority. As can be seen from the FIG. 4, the options Rotate Left, Rotate Right, Flip Left, Flip Right surround the Magnifier with the highest priority and are arranged according to priority in an decreasing order. The first area in the central position may be used to display Magnifier, and the second area is used to counterclockwise display Rotate Left, Rotate Right, Flip Left and Flip Right. Other options are hidden and displayed in a specified icon of ellipsis, and the ellipsis represents the hidden options to be toggled, such as Detection Display and 3D Display. Certainly, the options included in the Tools menu may also be displayed in the form of a list, as shown in FIG. 5. Magnifier, Rotate Left, Rotate Right, Flip Left and Flip Right are displayed in sequence from top to bottom, where Magnifier option extrudes from other options and moves left, indicating that it is selected.

In the above block S103 of FIG. 1, toggling the options in the Tools menu according to the second instructing operation for the Tools menu performed by the user includes: toggling the options in the Tools menu according to a clicking frequency, a wheel event and/or a touch event of a mouse.

In an example, a double click of a mouse may indicate that Zoom In option will be toggled, and scrolling a mouse wheel may indicate the options in the Tools menu will be sequentially toggled. For another example, when having a touch screen, the options in the Tools menu may be toggled through operations such as clicking and sliding on the touch screen.

In the above block S103 of FIG. 1, toggling the options in the Tools menu according to the second instructing operation from a user for the Tools menu further includes:

When toggling to any option in the Tools menu, the option is highlighted or extruded as a 3D ball. For example, when toggling to the option Flip Right according to the second instructing operation from a user, the Flip Right option is distinguished from other options in a highlight color. Alternatively, when toggling to the option Flip Right according to the second instructing operation from a user, the Flip Right option is extruded as a 3D ball to differ from other options.

During toggling options, a toggled option may be hid and a hidden option to be toggled may be displayed. For example, when options are toggled by scrolling according to the wheel event of the mouse, the toggled options are hidden and the hidden options to be toggled are displayed. For example, the options such as Rotate Left, Rotate Right, Flip Left, and Flip Right are displayed sequentially, and the options Detection Display and 3D Display are hidden. The options Rotate Left and Rotate Right are toggled by scrolling with the wheel, e.g., the options Rotate Left and Rotate Right are not selected, and in other words, the options Rotate Left and Rotate Right are hidden. The options Detection Display and 3D Display to be toggled are displayed.

In an example, a virtual button may further be displayed on the image display page to simulate a mouse where the virtual button includes a virtual wheel. The virtual button may be displayed in a form of virtual touchable operation and an option may be selected by directly touching the virtual button. The virtual wheel of the virtual button may be scrolled to toggle options and an option may be selected by touching the virtual wheel.

Figure 6:
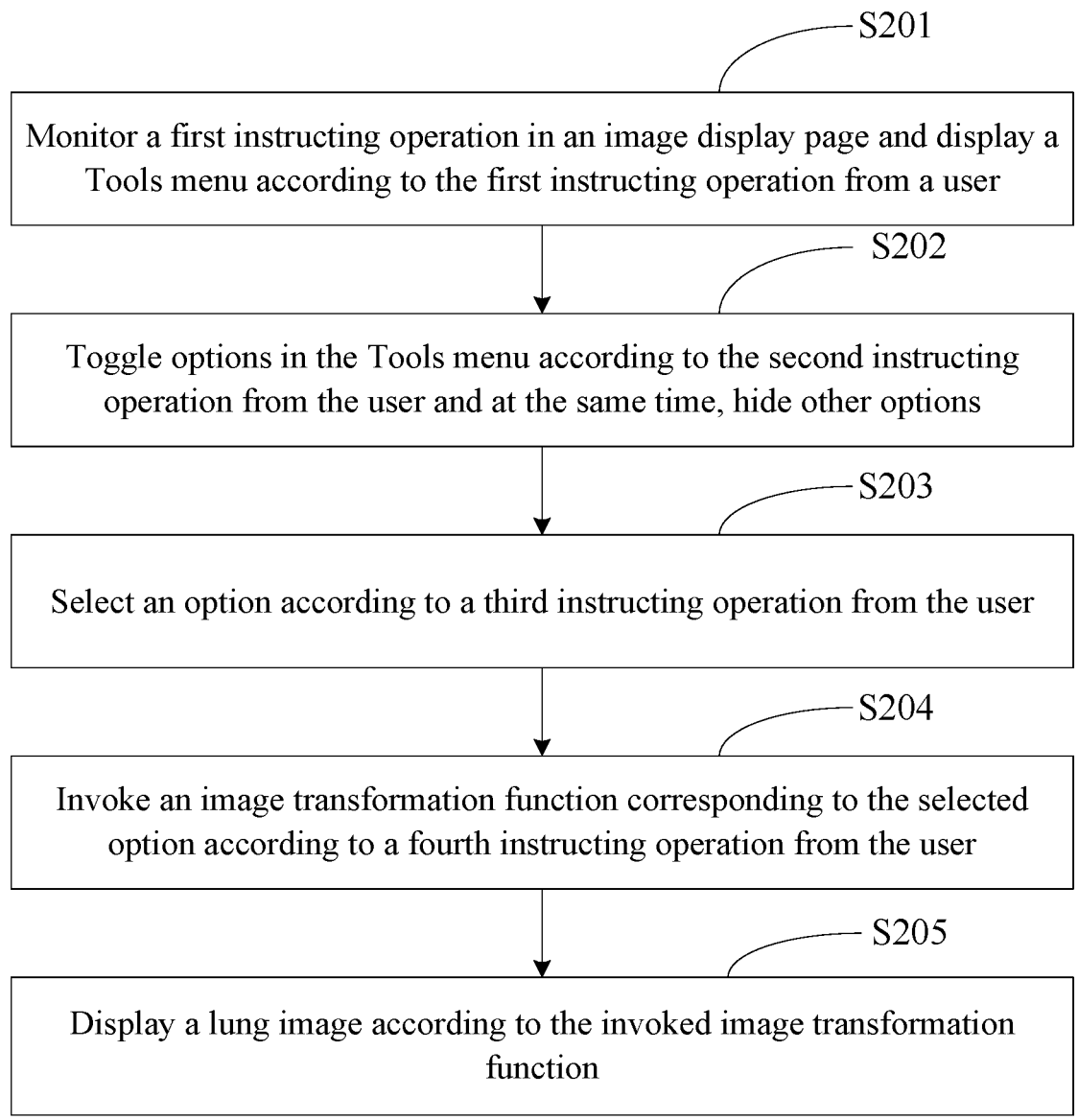
FIG. 6 is a flow diagram of a process illustrating a display method according to yet another example of the present disclosure.

FIG. 6 is a flow diagram of a process illustrating a display method according to yet another example of the present disclosure. As shown in FIG. 6, the present disclosure will be further described below by taking a lung image in a medical image viewing scenario as an example. The display method in the present disclosure may be applied to magnification view of a lung image, including the following blocks S201-S205.

At block S201: a first instructing operation in an image display page is monitored and a Tools menu is displayed according to the first instructing operation from a user.

A program of a display method of the present disclosure is started by a mouse (this example is referred to Magic Mirror Function for brevity) to monitor a mouse event as the first instructing operation. The cursor of the mouse may be changed into a magic mirror form according to the first instructing operation from the user. Display of the magic mirror may be referred to FIG. 4. The Tools menu includes but not limited to Magnifier, Flip Left, Flip Right, Rotate Left, and Rotate Right. The operations such as single click, double click, moving, dragging, wheel scrolling, and so on for a mouse may be monitored in real time. When it is detected that a user clicks the left mouse button, the Tools menu may be opened.

At block S202, options in the Tools menu are toggled according to the second instructing operation from the user and at the same time, other options are hidden.

In an example, the options in the Tools menu may be toggled according to the scrolling of the mouse wheel and at the same time, other toggled options may be hidden.

At block S203, an option is selected according to a third instructing operation from the user.

In an example, a currently toggled option may be selected when a mouse click from the user is detected.

At block S204, an image transformation function corresponding to the selected option is invoked according to a fourth instructing operation from the user.

For example, the option Magnifier may be selected by a user. At this time, the user may slide with the mouse to request a corresponding algorithm to magnify (or zoom in) the lung image or an interested area when it is detected that the user clicks the left mouse button on the lung image or the user draws the interested area on the lung image by sliding with the mouse.

Figure 7:
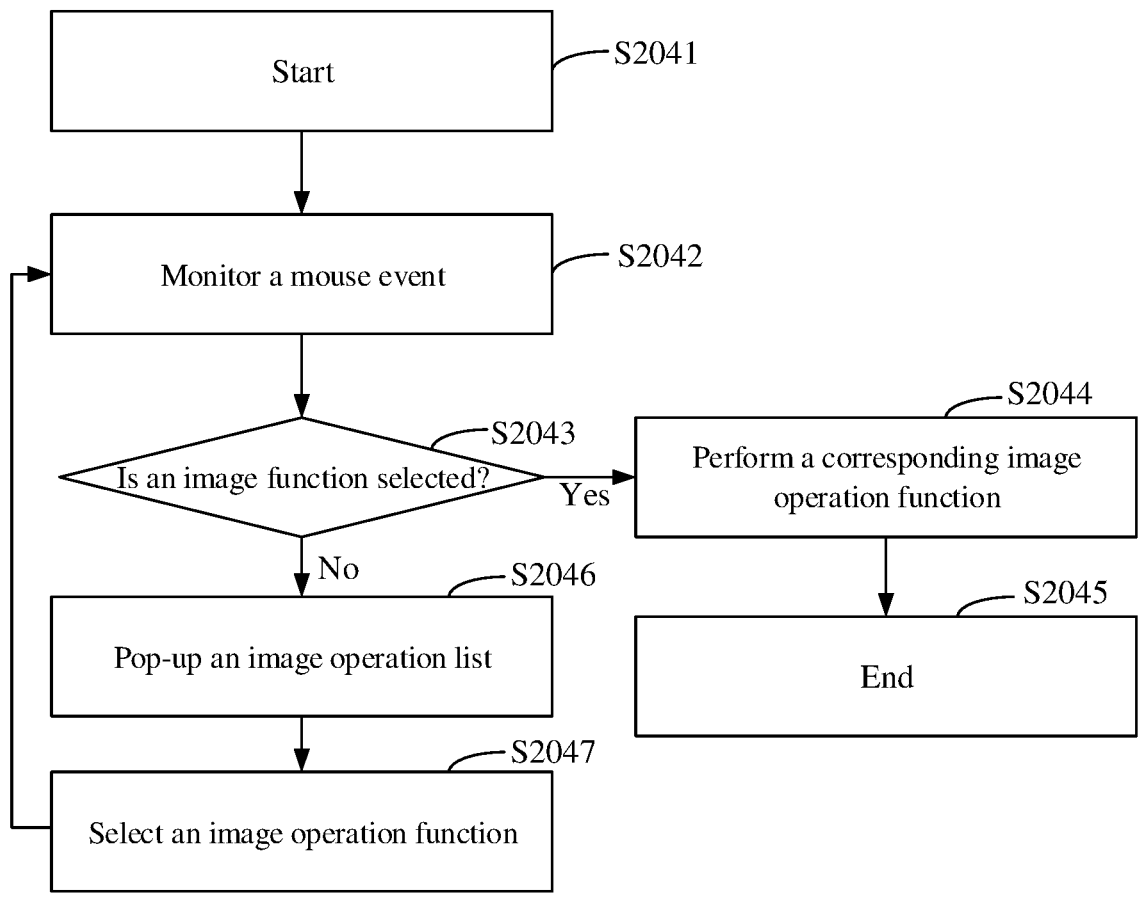
FIG. 7 is a detailed flow diagram of block S204 in FIG. 6.

FIG. 7 is a detailed flow diagram of block S204 in FIG. 6. As shown in FIG. 7, blocks for invoking the image transformation function in block S204 include:

At block S2041: start;

At block 2042: a mouse event is monitored;

At block 2043: it is determined whether an image function is selected; if yes, block S2044 is executed, and if not, block S2046 is executed. For example, it is determined whether an option is selected. The option includes Rotate Left, Rotate Right, Flip Left, Flip Right etc.

At block S2044: a corresponding image operation function is performed, for example, the image transformation function may be executed.

At block S2045: end.

At block S2046: an image operation list is popped up; for example, an image view function list of the image transformation function is popped up.

At block S2047: an image operation function is selected, for example, the image transformation function may be selected, and return to block S2042.

At block S205 of FIG. 6: a lung image is displayed according to the invoked image transformation function.

For example, a corresponding image magnification operation may be performed on the lung image by requesting an image transformation function of a magnifier. Non-destruction magnification of the same proportion may be performed on the image according to a rule to transmit the magnified image to a display area for display. In this block, a backstage algorithm may be invoked in a new thread to perform magnification display calculation for the image. In this way, a magnified image may be generated with the calculated result, the magnified image may be sent to the lung image and a magnification effect may be displayed at a corresponding position of the lung image.

In the present disclosure, options may be integrated, an image may be selected by a mouse operation event, the options may be associated with the selected image, and display functions may be selected by a mouse wheel or a click frequency, thereby improving viewing efficiency.

Corresponding to the examples of the display method as described above, the present disclosure further provides a display apparatus.

Figure 8:
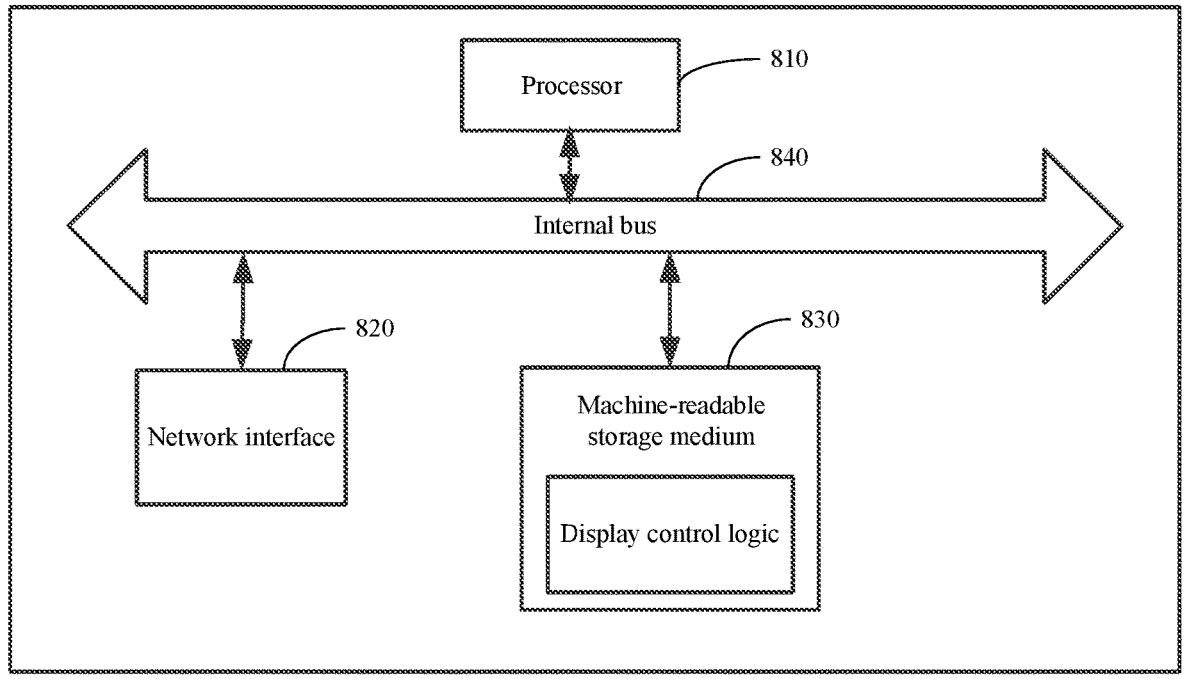
FIG. 8 is a hardware structure diagram of a display apparatus according to an example of the present disclosure.

FIG. 8 is a hardware structure diagram of a display apparatus according to an example of the present disclosure. The display apparatus may be implemented by software, or may be implemented by hardware or combination of software and hardware. In terms of hardware, in addition to a processor 810, a network interface 820, a machine-readable storage medium 830 and an internal bus 840 as shown in FIG. 8, the display apparatus may further include other hardware based on actual functions, and further details are omitted for brevity.

In different examples, the machine readable storage medium 830 may be a read-only memory (ROM), a volatile memory, a non-volatile memory, a flash memory, a memory drive (such as a hard disk drive), a solid state drive, any type of memory disks (such as an optical disk or a DVD and so on), or similar storage medium or a combination thereof.

Figure 9:
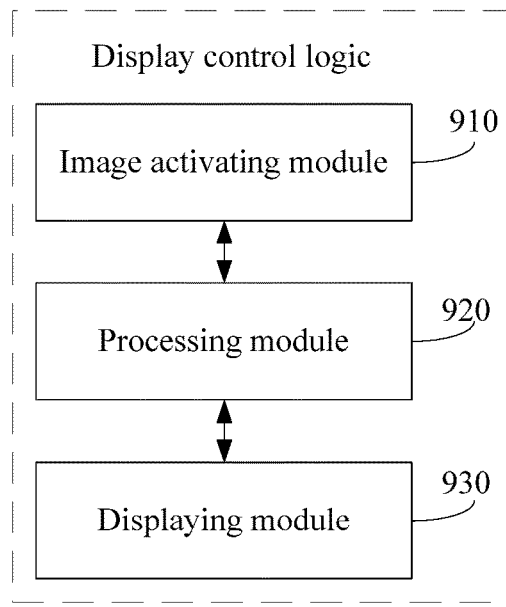
FIG. 9 is a functional module diagram of display control logic according to an example of the present disclosure.

Further, the machine-readable storage medium 830 may store a display control logic. As shown in FIG. 9, functionally, the display control logic may include an image activating module 910, a processing module 920 and a displaying module 930.

The image activating module 910 may be configured to activate an image to be viewed.

The processing module 920 may be configured to monitor an instructing operation from a user, display a Tools menu associated with the activated image according to a first instructing operation, and toggle options in the Tools menu according to a second instructing operation for the Tools menu.

The displaying module 930 may be configured to select an option from the toggled options according to a user operation and display activated image according to the selected option.

In an example, the display control logic may further include an inter-thread interacting module configured to create a thread to execute an image transformation function, and enable inter-thread interaction to separate a process of monitoring instructing operation from the execution of the image transformation function.

In an example, the processing module 920 may be further configured to replace a cursor style with the Tools menu associated with the activated image, where the Tools menu includes at least two areas with a first area for displaying an option in the Tools menu and a second area for displaying other options in the Tools menu.

In an example, the option in the first area is a default option or an option with the highest priority, and the other options in the second area surround the first area and are arranged clockwise or counterclockwise according to priority.

In an example, when the other options in the second area are out of a range of the second area, the processing module 920 may be further configured to display a part of the other options in the second area, and hide remaining options in the other options, and display the remaining options in a specified icon.

In an example, the processing module 920 may be further configured to toggle the options in the Tools menu according to at least one of a clicking frequency, a wheel event, and a touch event of a mouse.

In another example, the processing module 920 may be further configured to highlight an option in the Tools menu which is toggled to now, or extrude the option as a 3D ball, hide an toggled option and display a hidden option to be toggled.

In an example, the options may include Detection Display, 3D Display, Zoom In, Zoom Out, Rotate, and Flip.

In an example, the display control logic may further include a virtual button displaying module configured to display the virtual button in an image display page and the virtual button includes a virtual wheel.

Taking software implementation as an example, how the display apparatus executes the display control logic will be further described. In this example, the display control logic in the present disclosure should be interpreted as machine-executable instructions stored on the machine-readable storage medium 830. When the processor 810 of the display apparatus in the present disclosure executes the control logic, the processor 810 may be caused to execute the above display method by invoking the machine-executable instructions corresponding to the display control logic stored on the machine-readable storage medium 830.

Details of the implementation process of the functions and effects of different modules in the above-described display control logic may be seen from the implementation process of corresponding blocks in the above-described method, which will not be redundantly described herein.

The present disclosure also provides a machine-readable storage medium including machine-executable instructions, for example, the machine-readable storage medium 830 in FIG. 8. The machine-executable instructions may be executed by the processor 810 in a display apparatus to implement the above-described display method.

The foregoing disclosure is merely illustrative of preferred embodiments of the disclosure but not intended to limit the disclosure, and any modifications, equivalent substitutions, adaptations thereof made without departing from the spirit and scope of the disclosure shall be encompassed in the claimed scope of the appended claims.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The above description is merely preferred examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

The invention claimed is:

1. A display method for toggling and viewing images in panoramic medical imaging, the method comprising:
   activating a medical image to be viewed;
   monitoring an instructing operation from a user;
   associating a Tools menu with the activated medical image according to a first instructing operation, wherein associating the Tools menu with the activated medical image according to the first instructing operation comprises:
      displaying an overall Tools menu according to the first instructing operation, wherein the overall Tools menu comprises Detection Display, 3D Display, Zoom In, Zoom Out, Rotate, and Flip;
      determining one or more options in the overall Tools menu according to a storage type of the activated medical image, wherein when the storage type of the activated medical image is photo format, the one or more options comprise Zoom In, Zoom Out, Rotate, and Flip; and when the storage type of the activated medical image is 3D image, the one or more options comprise Detection Display and 3D Display; and
      associating the Tools menu formed by the one or more options with the activated medical image, wherein when the storage type of the activated medical image is photo format, Detection Display and 3D Display in the overall Tools menu are hidden and not included in the Tools menu; and when the storage type of the activated medical image is 3D image, Zoom In, Zoom Out, Rotate, and Flip are hidden and not included in the Tools menu;
   displaying the Tools menu associated with the activated medical image;
   toggling options in the Tools menu according to a second instructing operation for the Tools menu;
   selecting an option from the toggled options according to a user operation; and
   displaying the activated medical image according to the option;
   wherein displaying the Tools menu associated with the activated medical image comprises:
      replacing a cursor style with the Tools menu associated with the activated medical image, wherein the Tools menu comprises:
         a first area for displaying an option in the Tools menu; and
         a second area for displaying other options in the Tools menu;
      wherein the option in the first area is an option with a maximum used frequency, and the other options in the second area surround the first area and are arranged clockwise according to used frequency.

2. The display method of claim 1, further comprising:
   creating a thread to execute an image transformation function; and
   enabling inter-thread interaction to separate a process of monitoring the instructing operation from execution of the image transformation function.

3. The display method of claim 1, further comprising:
   when the other options in the second area are out of a range of the second area,
      displaying a part of the other options in the second area, hiding remaining options in the other options, and displaying the remaining options in a specified icon.

4. The display method of claim 3, wherein toggling the options in the Tools menu according to the second instructing operation for the Tools menu comprises:
   toggling the options in the Tools menu according to at least one of a clicking frequency, a wheel event, and a touch event of a mouse.

5. The display method of claim 4, wherein toggling the options in the Tools menu according to the second instructing operation for the Tools menu comprises:
   when toggling to any one of the options in the Tools menu, highlighting the option in the Tools menu or extruding the option as a 3D ball;
   hiding a toggled option; and
   displaying a hidden option to be toggled.

6. The display method of claim 5, wherein the options comprise at least one of Detection Display, 3D Display, Zoom In, Zoom Out, Rotate, and Flip.

7. The display method of claim 1, further comprising:
   displaying a virtual button on an image display page, wherein the virtual button comprises a virtual wheel.

8. The display method of claim 1, wherein activating the medical image to be viewed comprises at least one of:
   when a cursor enters an area range of the medical image to be viewed, activating the medical image to be viewed;
   when a hovering position of the cursor is within the area range of the medical image to be viewed, activating the medical image to be viewed; and
   clicking the medical image to be viewed.

9. The display method of claim 8, wherein the medical image to be viewed is displayed on an image display page as one of a plurality of medical images on the image display page, wherein each of the plurality of medical images has an area range on the image display page.

10. A display apparatus for toggling and viewing images in panoramic medical imaging, comprising:
    a processor and a machine-readable storage medium,
    wherein by invoking and executing machine-executable instructions corresponding to a display control logic stored on the machine-readable storage medium, the processor is caused to:
       activate a medical image to be viewed;
       monitor an instructing operation from a user;
       associate a Tools menu with the activated medical image according to a first instructing operation, wherein associating the Tools menu with the activated medical image according to the first instructing operation comprises:
          displaying an overall Tools menu according to the first instructing operation, wherein the overall Tools menu comprises Detection Display, 3D Display, Zoom In, Zoom Out, Rotate, and Flip;
          determining one or more options in the overall Tools menu according to a storage type of the activated medical image, wherein when the storage type of the activated medical image is photo format, the one or more options comprise Zoom In, Zoom Out, Rotate, and Flip; and when the storage type of the activated medical image is 3D image, the one or more options comprise Detection Display and 3D Display; and
          associating the Tools menu formed by the one or more options with the activated medical image, wherein when the storage type of the activated medical image is photo format, Detection Display and 3D Display in the overall Tools menu are hidden and not included in the Tools menu; and when the storage type of the activated medical image is 3D image, Zoom In, Zoom Out, Rotate, and Flip are hidden and not included in the Tools menu;

display the Tools menu associated with the activated medical image;

toggle options in the Tools menu according to a second instructing operation for the Tools menu;

select an option from the toggled options according to a user operation; and display the activated medical image according to the selected option;

wherein when displaying the Tools menu associated with the activated medical image, the processor is further caused by the machine-executable instructions to:

replace a cursor style with the Tools menu associated with the activated image, wherein the Tools menu comprises:
  a first area for displaying an option in the Tools menu, and
  a second area for displaying other options in the Tools menu;

wherein the option in the first area is an option with a maximum used frequency, and the other options in the second area surround the first area and are arranged counterclockwise according to used frequency.

11. The apparatus of claim 10, wherein the processor is further caused by the machine-executable instructions to:
create a thread to execute an image transformation function; and
enable inter-thread interaction to separate a process of monitoring the instructing operation from execution of the image transformation function.

12. The apparatus of claim 10, wherein the processor is further caused by the machine-executable instructions to:
when the other options in the second area are out of a range of the second area,
  display a part of the other options in the second area,
  hide remaining options in the other options, and
  display the remaining options in a specified icon.

13. The apparatus of claim 12, wherein when toggling the options in the Tools menu according to the second instructing operation for the Tools menu, the processor is further caused by the machine-executable instructions to:
toggle the options in the Tools menu according to at least one of a clicking frequency, a wheel event, and a touch event of a mouse.

14. The apparatus of claim 13, wherein when toggling the options in the Tools menu according to the second instructing operation for the Tools menu, the processor is further caused by the machine-executable instructions to:
when toggling to any one of the options in the Tools menu, highlight the option in the Tools menu or extrude the option as a 3D ball;
hide a toggled option; and
display a hidden option to be toggled.

15. The apparatus of claim 14, wherein the options comprise at least one of Detection Display, 3D Display, Zoom In, Zoom Out, Rotate, and Flip.

16. The apparatus of claim 10, wherein the processor is further caused by the machine-executable instructions to:
display a virtual button on an image display page, wherein the virtual button comprises a virtual wheel.

* * * * *